(12) United States Patent
Sluyterman

(10) Patent No.: US 6,664,746 B2
(45) Date of Patent: Dec. 16, 2003

(54) DYNAMIC FOCUSING CIRCUIT, PICTURE DISPLAY DEVICE AND METHOD OF GENERATING A DYNAMIC FOCUSING VOLTAGE

(75) Inventor: Albertus Aemilius Seyno Sluyterman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/180,401

(22) Filed: Jun. 26, 2002

(65) Prior Publication Data
US 2003/0001527 A1 Jan. 2, 2003

(30) Foreign Application Priority Data
Jun. 28, 2001 (EP) .............................. 01202502

(51) Int. Cl.[7] ................................................ G09G 1/04
(52) U.S. Cl. ...................................... 315/364; 315/382
(58) Field of Search ............................. 315/364, 365, 315/382, 382.1, 397, 399, 403, 405, 368.18, 368.23, 368.21; 313/364, 382; G09G 1/04

(56) References Cited
U.S. PATENT DOCUMENTS 5,430,358 A * 7/1995 George ........................ 315/382
5,886,482 A * 3/1999 Watanabe et al. ........... 315/382.1
6,018,222 A * 1/2000 Vaneerdewegh et al. ..... 315/382
6,404,147 B1 * 6/2002 Shigematsu et al. ... 315/368.21
6,445,145 B1 * 9/2002 Oosuga et al. ............ 315/382.1
2002/0021094 A1 * 2/2002 De Wulf ........................ 315/1

FOREIGN PATENT DOCUMENTS

JP   04135378   * 8/1992 ............ H04N/3/26

OTHER PUBLICATIONS

Patent Abstracts of Japan, Kawachi Makoto, "Dynamic Focus Correcting Circuit" Publication No. 04135378, Aug. 5, 1992, Application No. 02259678, Sep. 27, 1990.

* cited by examiner

*Primary Examiner*—Don Wong
*Assistant Examiner*—Trinh Vo Dinh

(57) ABSTRACT

A dynamic focusing circuit includes a transformer with a primary winding for receiving a line-frequency deflection current and a secondary winding for supplying a transformed deflection current. An integrator, coupled to the secondary winding, generates a line-frequency focusing voltage from the transformed deflection current. A waveform generator coupled to the secondary winding generates an additional line-frequency focusing voltage and superimposes the additional line-frequency focusing voltage on the line-frequency focusing voltage.

12 Claims, 3 Drawing Sheets

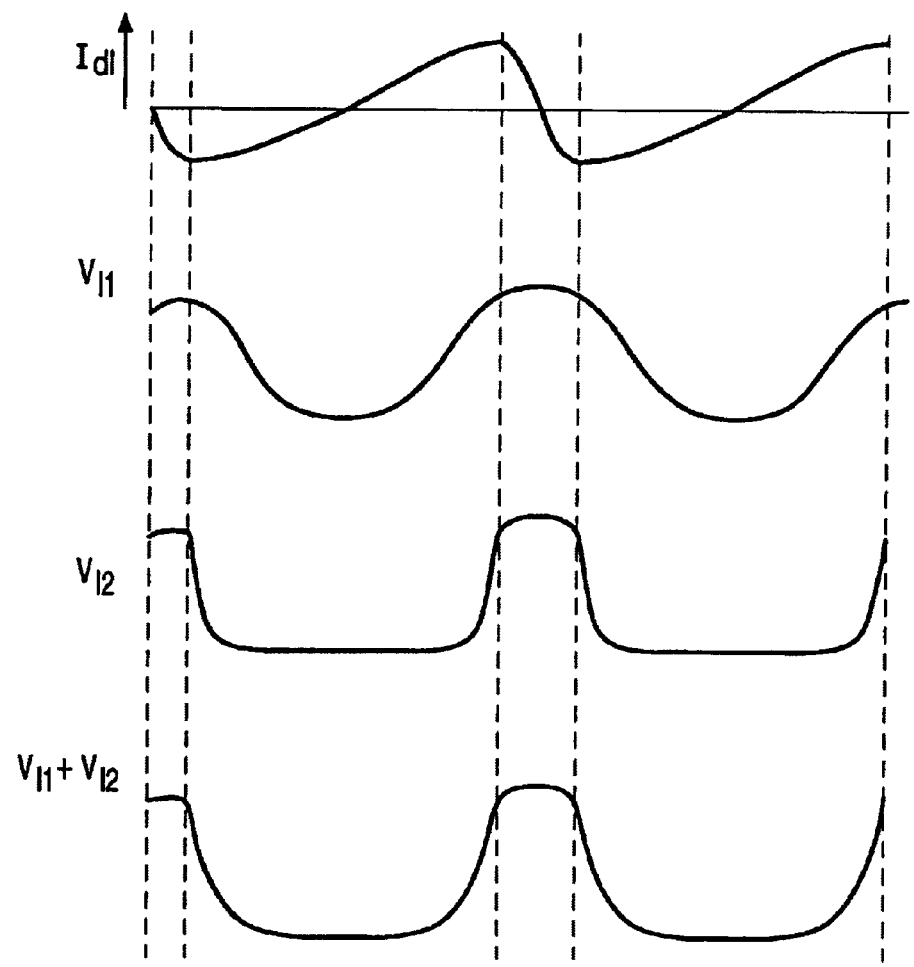
FIG. 2A
FIG. 2B
FIG. 2C
FIG. 2D
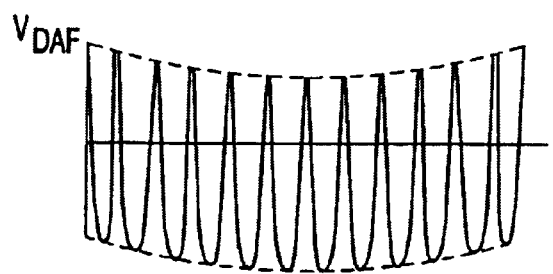
FIG. 2E

DYNAMIC FOCUSING CIRCUIT, PICTURE DISPLAY DEVICE AND METHOD OF GENERATING A DYNAMIC FOCUSING VOLTAGE

FIELD OF TECHNOLOGY

The invention relates to a dynamic focusing circuit comprising a transformer with a primary winding for receiving a line-frequency deflection current and a secondary winding for supplying a transformed deflection current, and an integrator, coupled to the secondary winding, for generating a line-frequency focusing voltage from the transformed deflection current.

The invention also relates to a picture display device comprising a cathode ray tube with an electron gun provided with a DAF section, deflection means, a deflection circuit and a dynamic focusing circuit of the type described in the opening paragraph.

The invention also relates to a method of generating a line-frequency focusing voltage in a picture display device, the method comprising the steps of transforming a line-frequency deflection current to a transformed deflection current, and integrating the transformed deflection current to a line-frequency focusing voltage.

BACKGROUND AND SUMMARY

A prior-art dynamic focusing circuit generating a dynamic focusing voltage in accordance with a method described in the opening paragraph is known from, for example, U.S. Pat. No. 5,430,358.

An electron beam is imaged on a display screen of a picture display device comprising a cathode ray tube. The electron beam is generated by the electron gun in the cathode ray tube and imaged on the display screen. The display screen is provided with rows or dots of phosphors which luminesce when they are impinged upon by the electron beam.

The picture display device comprises deflection means for deflecting an electron beam in the cathode ray tube. The deflection means are controlled by a deflection circuit in the picture display device. This deflection circuit generates a line-frequency deflection current and a field-frequency deflection current, synchronized with a video signal received by the picture display device. In this way, the landing spot of the electron beam on the display screen changes and the video signal is displayed on the display screen.

By deflecting the electron beam by way of the deflection means, the electrons between the electron source and the landing spot on the display screen travel a longer path. More particularly, the electrons between a main lens, which focuses the electron beam, and the display screen travel a longer path in dependence upon the deflection. As a result, the electron beam is no longer substantially focused throughout the display screen, and the electron beam is imaged relatively out of focus on at least a part of the display screen.

When deflecting the electrons, the deflection means also act as an electron-optical quadrupolar lens so that astigmatism occurs and the shape of the electron beam changes in dependence upon the deflection.

These effects are most pronounced in the corners of the display screen, i.e. when the deflection of the electrons is greatest in both the line-frequency direction and the field-frequency direction.

To reduce these effects, the electron gun may be provided with a section referred to as DAF section as is known from, for example, U.S. Pat. No. 4,742,279. The DAF section comprises a further electron-optical quadrupolar lens whose power can be dynamically varied in dependence upon the deflection of the electrons so as to at least partly correct astigmatism caused by the deflection means. Moreover, the DAF section may change the power of the main lens so that the electron beam can be substantially in focus throughout the display screen.

The DAF section receives a fixed focusing voltage and a dynamic focusing voltage supplied by a dynamic focusing circuit.

In the prior-art dynamic focusing circuit, a transformer receives the line-frequency deflection current from the deflection circuit, which deflection current is substantially sawtooth-shaped. The transformer transforms the line-frequency deflection current, whereafter the transformed line-frequency deflection current is integrated by a capacitor to a line-frequency deflection voltage. The dynamic focusing circuit also generates a field-frequency deflection voltage. In the known dynamic focusing circuit, the field-frequency deflection voltage is formed from the line-frequency deflection voltage. The line-frequency focusing voltage and the field-frequency focusing voltage are combined to a dynamic focusing voltage which is combined with a fixed focusing voltage, for example, via a coupling capacitor. The resultant voltage is applied to the DAF section of the electron gun.

It is desirable to have a relatively small depth of the cathode ray tube for a display screen having a relatively large surface area. This means that the electron beam is deflected through relatively large angles, for example, 120°. At such deflection angles, the electron beam near the edges of the display screen, and particularly in the corners of the display screen, is considerably out of focus and astigmatic to a relatively strong extent. The correction of these effects by the DAF section requires a dynamic focusing voltage with a relatively large amplitude, for example, 2000 volts.

Generally, the display screen has a larger dimension in the line-frequency direction than in the field-frequency direction, the ratio being, for example, 4:3 or 16:9. It is then advantageous if the line-frequency focusing voltage constitutes a considerable part of the dynamic focusing voltage, i.e. the line-frequency focusing voltage has an amplitude of, for example, 1500 volts. and the field-frequency focusing voltage has an amplitude of, for example, 500 volts.

The known dynamic focusing circuit supplies a line-frequency focusing voltage having a parabola shape which is flattened near the edges of the screen. Moreover, the line-frequency deflection current in the corners of the display screen is smaller than on the line axis of the display screen, which is due to a pincushion-shaped distortion of the frame by the deflection field.

These effects give the line-frequency focusing voltage a shape which substantially deviates from the desired shape, so that the defocusing and the astigmatism of the electron beam are insufficiently reduced near the edges of the display screen and particularly in its corners.

The ideal shape of the line-frequency focusing voltage is generally a shape referred to as bathtub shape. A bathtub shape is herein understood to mean a substantially fourth-order shape which, as compared with a parabola shape, is relatively flat near a center of the display screen and relatively steep near the edges of the display screen.

In an alternative prior-art dynamic focusing circuit, the line-frequency focusing voltage is entirely generated by means of a waveform-generating circuit, while the dynamic focusing circuit does not comprise a transformer. Such a circuit is described in, for example, EP-B-0 741 948. In this circuit, the shape of the line-frequency focusing voltage can be optimally suited to the desired shape. However, this circuit has the problem that the line-frequency focusing voltage is limited to approximately 1200 volts due to transistor limitations in the waveform generator.

It is possible to use transistors which can generate a higher line-frequency focusing voltage than 1200 volts, but these transistors are expensive and have great dissipation losses.

It would be advantageous to provide a dynamic focusing circuit of the type described in the opening paragraph, which can supply, in a relatively inexpensive way, a line-frequency focusing voltage of the amplitude and shape required for a picture display device with a relatively large maximal deflection angle of the electron beam. For example, a waveform generator can be coupled to the secondary winding to generate an additional line-frequency focusing voltage and to superimpose the additional line-frequency focusing voltage on the line-frequency focusing voltage.

The circuit and the method according to the invention have the advantage that a line-frequency focusing voltage with a relatively large amplitude is generated by means of the transformer, on which focusing voltage an additional line-frequency focusing voltage is superimposed for correcting the shape of the line-frequency focusing voltage. The line-frequency focusing voltage may then have an amplitude which is larger than 1500 volts. This is particularly advantageous in a picture display device in which the electron beam is deflected through a relatively large angle.

It is advantageous if the additional line-frequency focusing voltage has a shape correcting the line-frequency focusing voltage to a bathtub shape. The line-frequency focusing voltage generally has a parabola shape which is flattened near the edges of the display screen so that it is advantageous when the additional line-frequency focusing voltage has substantially fourth-order and higher-order line-frequency components. Such a signal is capable of causing the line-frequency focusing voltage to change sufficiently fast near the edge of the display screen and can be easily generated by means of a waveform-generating circuit.

To ensure that the additional line-frequency focusing voltage satisfactorily corrects the shape of the line-frequency focusing voltage, while the total line-frequency component of the dynamic focusing voltage has a sufficiently large amplitude, it may be advantageous when the amplitude of the additional line-frequency focusing voltage and of the line-frequency focusing voltage are of the same order. The additional line-frequency focusing voltage may then have an amplitude of between 0.5 and 2 times the amplitude of the line-frequency focusing voltage.

It would also be advantageous to provide a picture display device having a relatively large maximal deflection angle, in which the electron beam is substantially in focus throughout the display screen and astigmatism of the electron beam is limited as much as possible. Accordingly, one or more embodiments of the invention include a dynamic focusing circuit that supplies a dynamic focusing voltage to the DAF section in the electron gun, which dynamic focusing voltage corresponds as much as possible to the actually required dynamic focusing voltage so that the electron beam is substantially in focus throughout the display screen and astigmatism is limited as much as possible.

It is advantageous when the primary winding of the transformer of the dynamic focusing circuit is coupled to the deflection circuit. In this way, the dynamic focusing circuit for generating the line-frequency focusing voltage can receive the line-frequency deflection current so that no extra components are required for generating said line-frequency deflection current.

It would also be advantageous to provide a method of generating, in a relatively inexpensive way, a line-frequency focusing voltage of the amplitude and shape required for a picture display device with a relatively large maximal deflection angle of the electron beam.

These and other aspects of the invention are apparent from and will be elucidated with reference to the embodiments described hereinafter.

BRIEF DESCRIPTION OF THE DRAWINGS

In the drawings:

FIGS. 2A–2E show the shapes of selected electric signals in the dynamic focusing circuit;

DETAILED DESCRIPTION

Figure 1:
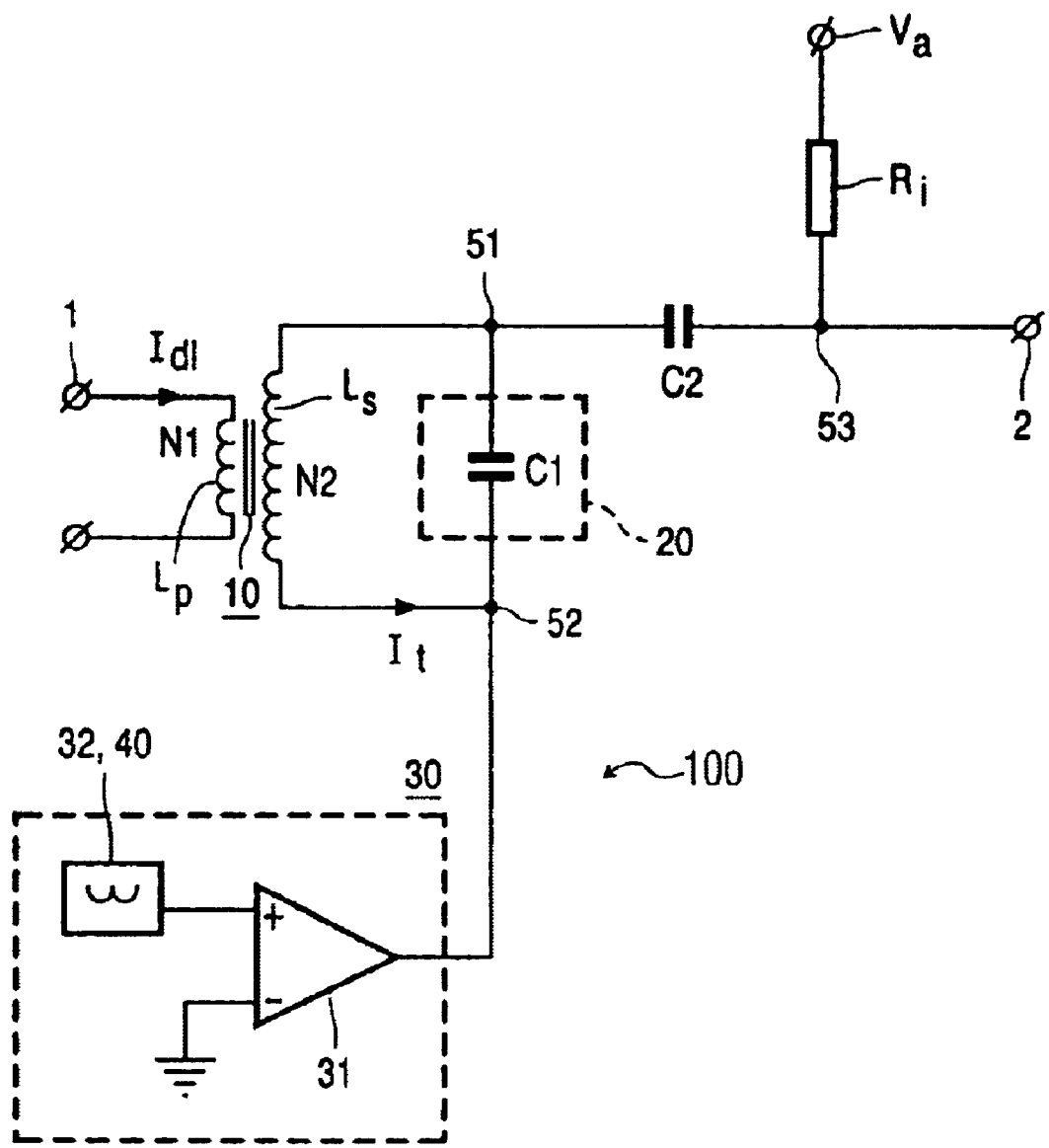
FIG. 1 shows an embodiment of a dynamic focusing circuit according to the invention.

The dynamic focusing circuit 100 receives a line-frequency deflection current Idl at the input 1. This deflection current has a value of, for example, 8 A and a frequency of 60 kHz for a display screen with 800×600 pixels and a refresh rate of 100 Hz. The input 1 is coupled to a primary winding Lp of a transformer 10. This transformer 10 also has a secondary winding Ls. To supply a transformed line-frequency deflection current It, which is relatively small with respect to the line-frequency deflection current Idl, the number of turns N1 of the primary winding Lp is relatively small as compared with the number of turns N2 of the secondary winding Ls. The ratio between N1 and N2 is, for example, 1:100 and the transformed line-frequency deflection current It then has a value of 80 mA.

An integrator 20 consisting of a capacitor C1 is arranged parallel to the secondary winding Ls between the nodes 51 and 52. This produces a line-frequency focusing voltage Vl1 between the nodes 51 and 52. The line-frequency focusing voltage Vl1 has an amplitude of, for example 800 volts and to this end, the capacitor C1 may have a capacitance of approximately 0.5 $\mu$F for a line frequency of 60 kHz.

A waveform generator 30 for generating an additional line-frequency focusing voltage Vl2 is coupled to the node 52. The waveform generator comprises a circuit 32 which can generate a waveform in dependence upon the position of the electron beam on the screen. Such a circuit is described in, for example, the above-mentioned patent specification EP-B-0 741 948. The circuit 32 is an integrated circuit such as the Philips IC, type number TDA4856. Such a circuit may be alternatively formed as a discrete circuit or by means of a suitably programmed microprocessor.

The waveform-generating circuit 32 supplies a desired position-dependent correction waveform having an amplitude of, for example, 1 volt which is applied to a discrete amplifier 31. The amplifier has a gain of, for example, 800 so that an output of the amplifier 31 conveys an additional line-frequency focusing voltage Vl2 of the desired shape and amplitude. The additional line-frequency focusing voltage Vl2 is superimposed on the line-frequency focusing voltage Vl1.

The dynamic focusing circuit also comprises means 40 for generating a field-frequency focusing voltage. In the embodiment shown, these means are incorporated in the waveform-generating circuit 32 which thereby generates both a line-frequency signal and a field-frequency signal.

Alternative embodiments of such means 40 are extensively described in the prior art, for example, in the above-mentioned U.S. Pat. No. 5,430,358.

A coupling capacitor C2 is arranged between the nodes 51 and 53. The circuit receives a DC focusing voltage Va at node 53 via a resistor Ri. Va has an amplitude of, for example, 7500 volts. The dynamic focusing voltage Vdaf is superimposed on the DC focusing voltage Va via the coupling capacitor C2. Node 53 is further coupled to an output 2 of the dynamic focusing circuit.

To further illustrate the operation of the dynamic focusing circuit and elucidate the method according to the invention, FIG. 2 shows waveforms of selected electric signals which occur in the dynamic focusing circuit. More specifically, in FIG. 2:

FIG. 2A is the line-frequency deflection current Idl;

FIG. 2B is the line-frequency focusing voltage Vl1;

FIG. 2C is the additional line-frequency focusing voltage Vl2;

FIG. 2D is a the total line-frequency focusing voltage Vl1+Vl2;

FIG. 2E is the dynamic focusing voltage Vdaf.

Generally, the input 1 of the dynamic focusing circuit 100 will receive the line-frequency deflection current Idl which originates from the deflection means in a picture display device. The line-frequency deflection current Idl is substantially sawtooth-shaped.

At an instant t=t0, the line-frequency deflection current Idl has a minimal value and, viewed in the line-frequency direction, the electron beam 201 is then situated near a first edge of the display screen 240. The line-frequency deflection current Idl increases between t=t0 and t=t1 so that the electron beam 201 writes a line on the display screen 240. At an instant t=t1, the line-frequency deflection current Idl is maximal and the electron beam 201 is situated near an opposite edge of the display screen 240. Subsequently, the phenomenon referred to as flyback takes place between t=t1 and t=t2, in which the electron beam 201 is returned to the first edge for writing the next line. During the flyback, the electron beam 201 is switched off.

An S correction is applied on the sawtooth shape in FIG. 2A, which is intended to ensure that the electron beam 201 writes the display screen 240 at a substantially constant rate so that each pixel on the display screen 240 has a substantially equal illumination time and the light intensity of the displayed picture has a maximal uniformity.

The S-corrected line-frequency deflection current Idl is transformed and integrated to a line-frequency focusing voltage Vl1. This line-frequency focusing voltage Vl1 has a flattened parabola shape as shown in FIG. 2B. Less line-frequency focusing voltage than is desirable is available near the edges of the display screen 240.

By generating an additional line-frequency focusing voltage Vl2 and superimposing it on the line-frequency focusing voltage Vl1, the total line-frequency focusing voltage Vl1+Vl2 can indeed obtain the desired shape, for example, a bathtub shape. The total line-frequency focusing voltage has an amplitude of, for example, 2000 volts for a picture display device with a deflection angle of 120°.

The additional line-frequency focusing voltage Vl2 has a correction shape as shown in FIG. 2C. The correction shape is, for example, a shape substantially having components of the fourth and higher even orders. Such a correction shape is relatively flat near a line axis of the display screen 240 and relatively steep near the edges and ensures that the total line-frequency focusing voltage Vl1+Vl2 has a bathtub shape, as is shown in FIG. 2D.

The total line-frequency focusing voltage Vl1+Vl2 is combined with a field-frequency focusing voltage Vf to form a dynamic focusing voltage Vdaf. The field-frequency focusing voltage has, for example, a parabola shape with an amplitude of 500 volts and a frequency of 100 Hz. A possible shape of the dynamic focusing voltage Vdaf is shown in FIG. 2E. It should be noted that the number of periods of the line-frequency focusing voltage within a period of the field-frequency focusing voltage is actually considerably higher than is shown, said number of periods is, for example, 600.

Figure 3:
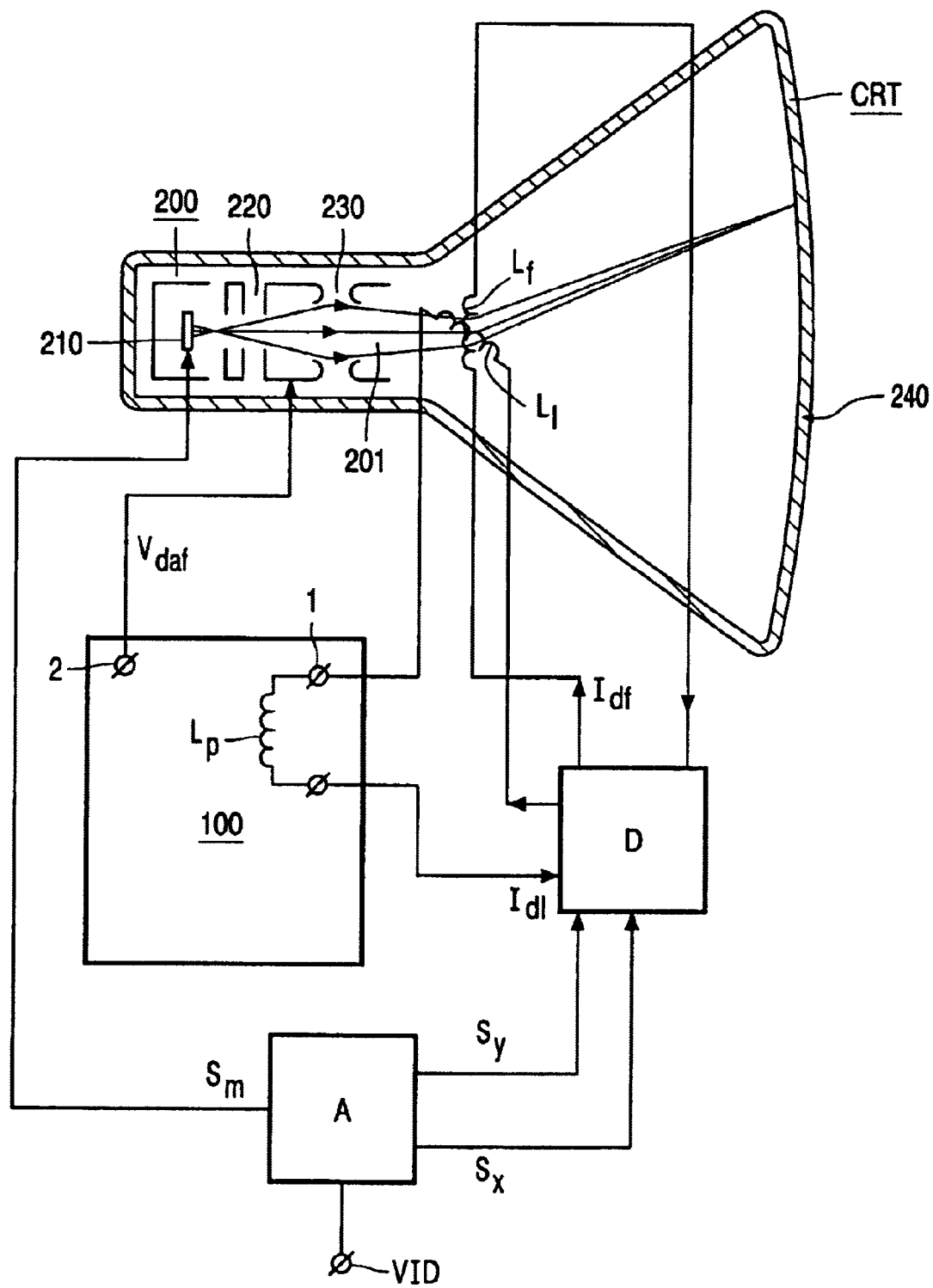
FIG. 3 shows a picture display device comprising the dynamic focusing circuit.

The dynamic focusing circuit 100 in a picture display device is used to control a DAF section 220 in a cathode ray tube CRT. This is shown in FIG. 3. A control unit A in the display device receives a video signal VID and generates a modulation signal Sm and drive signals Sx and Sy therefrom.

An electron gun 200 in the cathode ray tube CRT comprises an electron source 210 for generating an electron beam 201. The generated electrons are accelerated towards a display screen 240 which comprises phosphors luminescing as a result of the incidence of the generated electrons.

The electron beam 201 is focused by a main lens 230 on a display screen 240 comprising phosphors. The DAF section 220 is arranged between the electron source 210 and the main lens 230. An astigmatism of the electron beam 201 can be changed by means of the DAF section 220 and a focusing by the main lens 230 can be partly compensated so that the electron beam 201 is substantially in focus throughout the display screen 240.

The modulation signal Sm is applied to an electron source for modulating a current density of the electron beam 201 and thereby changing an intensity at which the phosphors luminesce at a landing spot of the electron beam 201 on the display screen 240.

The drive signals Sx and Sy are applied to a deflection circuit D which forms a line-frequency deflection current Idl and a field-frequency deflection current Idf therefrom. The field-frequency deflection current Idf is applied to a field deflection coil Lf. Generally, the field deflection coil Lf deflects the electron beam 201 in the vertical direction. The line-frequency deflection current Idl is applied to a line deflection coil Ll which deflects the electron beam 201 in the line-frequency direction, and is subsequently applied to the primary winding Lp via an input 1 of the dynamic focusing circuit 100. The line-frequency direction is generally the horizontal direction. The dynamic focusing circuit 100 forms a dynamic focusing voltage Vdaf from the line-frequency deflection current Idl for controlling the DAF section 220.

The drawings are diagrammatic and not drawn to scale. It will be evident that the Figures and the associated description illustrate rather than limit the invention. Those skilled in the art will be able to construct many alternative embodiments of a dynamic focusing circuit and a picture display device according to the invention. The invention has been described on the basis of a line-frequency focusing voltage with a falling part, a substantially flat part and a rising part. It is alternatively possible to use a line-frequency focusing voltage with a rising part, a substantially flat part and a falling part. A dynamic focusing voltage with a negative potential may also be used. All of these adaptations are considered to fall within the normal capabilities of those skilled in the art.

What is claimed is:

1. A dynamic focusing circuit comprising:
   a transformer with a primary winding for receiving a line-frequency deflection current and a secondary winding for supplying a transformed deflection current; and
   an integrator coupled to the secondary winding, for generating a line-frequency focusing voltage from the transformed deflection current,
   wherein a waveform generator coupled to the secondary winding is provided to generate an additional line-frequency focusing voltage and to superimpose the additional line-frequency voltage on the line-frequency focusing voltage; and
   wherein the line-frequency focusing voltage has an amplitude of at least 1500 volts after the additional line-frequency focusing voltage has been superimposed on the line-frequency focusing voltage.

2. A dynamic focusing circuit comprising:
   a transformer with a primary winding for receiving a line-frequency deflection current and a secondary winding for supplying a transformed deflection current; and
   an integrator coupled to the secondary winding, for generating a line-frequency focusing voltage from the transformed deflection current,
   wherein a waveform generator coupled to the secondary winding is provided to generate an additional line-frequency focusing voltage and to superimpose the additional line-frequency voltage on the line-frequency focusing voltage; and
   wherein the additional line-frequency focusing voltage has substantially fourth-order and higher order line-frequency harmonic components.

3. A dynamic focusing circuit comprising:
   a transformer with a primary winding for receiving a line-frequency deflection current and a secondary winding for supplying a transformed deflection current; and
   an integrator coupled to the secondary winding, for generating a line-frequency focusing voltage from the transformed deflection current,
   wherein a waveform generator coupled to the secondary winding is provided to generate an additional line-frequency focusing voltage and to superimpose the additional line-frequency voltage on the line-frequency focusing voltage;
   wherein the waveform generator comprises a waveform-generating circuit for generating the additional line-frequency focusing voltage (VI2), and also an amplifier, coupled to the waveform-generating circuit for amplifying the generated additional line frequency focusing voltage.

4. A dynamic focusing circuit comprising:
   a transformer with a primary winding for receiving a line-frequency deflection current and a secondary winding for supplying a transformed deflection current; and
   an integrator coupled to the secondary winding, for generating a line-frequency focusing voltage from the transformed deflection current,
   wherein a waveform generator coupled to the secondary winding is provided to generate an additional line-frequency focusing voltage and to superimpose the additional line-frequency voltage on the line-frequency focusing voltage;
   wherein the additional line-frequency focusing voltage has an amplitude of between 0.5 and 2 times the amplitude of the line-frequency voltage.

5. A picture tube display device comprising:
   a cathode ray tube for displaying a video signal;
   deflection means (L1, Lf) for deflecting an electron beam (201) in the cathode ray tube;
   an electron gun in the cathode ray tube for generating the electron beam, comprising a DAF section for dynamically adapting a focusing and an astigmatism of the electron beam in dependence upon the deflection of the electron beam,
   a deflection circuit, coupled to the deflection means for generating a line-frequency deflection current and a field-frequency deflection current, synchronized with the video signal, and
   a dynamic focusing circuit supplying line-frequency voltage to the DAF section,
   wherein the dynamic focusing circuit generates a line-frequency focusing voltage and an additional line-frequency focusing voltage that is added on said line-frequency voltage so that an amplitude of the line-frequency focusing voltage after the addition of said additional line-frequency focusing voltage is at least 1500 Volts.

6. The picture display device according to claim 5, wherein the additional line frequency voltage that is superimposed on the line-frequency focusing voltage has an amplitude between 0.5 and 2 times the amplitude of the line-frequency focusing voltage.

7. A picture display device as claimed in claim 5, wherein said dynamic focusing circuit includes a transformer with a primary winding for receiving a line-frequency deflection current and a secondary winding for supplying a transformed deflection current; and
   wherein the primary winding of the dynamic focusing circuit is coupled to the deflection circuit.

8. The picture display device according to claim 7, further comprising:
   a waveform generator coupled to the secondary winding of the transformer is provided to generate an additional line-frequency focusing voltage and to superimpose the additional line-frequency voltage on the line-frequency focusing voltage;
   wherein the waveform generator comprises a waveform-generating circuit for generating the additional line-frequency focusing voltage, and also an amplifier coupled to the waveform-generating circuit, for amplifying the generated additional line frequency focusing voltage.

9. A method of generating a line-frequency focusing voltage in a picture display device, the method comprising the steps of:
   transforming a line-frequency deflection current to a transformed deflection current; and
   integrating the transformed deflection current to a line-frequency focusing voltage,
   comprising the steps of
   generating an additional line-frequency focusing voltage and
   superimposing the additional line-frequency focusing voltage on the line-frequency focusing voltage;

wherein the line-frequency voltage has an amplitude of at least 1500 volts after the superimposing of the additional line-frequency focusing voltage.

10. A method as claimed in claim 9, wherein
the additional line frequency voltage that is superimposed in the superimposing step on the line-frequency focusing voltage has an amplitude between 0.5 and 2 times the amplitude of the line-frequency focusing voltage).

11. The method according to claim 10, wherein the additional line-frequency focusing voltage is generated in the generating step by providing a waveform generator coupled to a secondary winding of a transformer in the transforming step to generate an additional line-frequency focusing voltage and to superimpose the additional line-frequency voltage on the line-frequency focusing voltage;

wherein the waveform generator comprises a waveform-generating circuit for generating the additional line-frequency focusing voltage, and also an amplifier, coupled to the waveform-generating circuit, for amplifying the generated additional line frequency focusing voltage.

12. A method as claimed in claim 9, wherein the additional line-frequency voltage has substantially fourth-order and higher line-frequency harmonic components.

* * * * *